United States Patent
Yeh et al.

(10) Patent No.: US 7,451,479 B2
(45) Date of Patent: Nov. 11, 2008

(54) NETWORK APPARATUS WITH SECURE IPSEC MECHANISM AND METHOD FOR OPERATING THE SAME

(75) Inventors: Yao-Chih Yeh, Hsin-Chu (TW);
Yuan-Yu Cheng, Hsin-Chu (TW);
Hsin-Hao Cheng, Hsin-Chu (TW);
Chia-Yuan Chen, Hsin-Chu (TW)

(73) Assignee: Zyxel Communications Corporation, Hsin-Chu (TW)

( * ) Notice: Subject to any disclaimer, the term of this patent is extended or adjusted under 35 U.S.C. 154(b) by 678 days.

(21) Appl. No.: 11/066,472

(22) Filed: Feb. 28, 2005

(65) Prior Publication Data

US 2006/0195900 A1    Aug. 31, 2006

(51) Int. Cl.
*H04L 9/32* (2006.01)
*G06F 15/16* (2006.01)
(52) U.S. Cl. .............................. 726/2; 726/13; 726/14; 726/15

(58) Field of Classification Search ................. 726/2–4, 726/11–15; 713/150–154
See application file for complete search history.

(56) References Cited

U.S. PATENT DOCUMENTS

| 6,625,657 | B1 * | 9/2003 | Bullard ..................... 709/237 |
| 6,633,835 | B1 * | 10/2003 | Moran et al. ............... 702/190 |
| 2002/0133534 | A1 * | 9/2002 | Forslow ..................... 709/200 |

* cited by examiner

*Primary Examiner*—Hosuk Song
(74) *Attorney, Agent, or Firm*—Rosenberg, Klein & Lee

(57) ABSTRACT

A network apparatus with secure IPSec mechanism and method for operating the same are disclosed. The network apparatus includes a VLAN, an MAC filter, an IP restriction unit and a static DHCP. The network apparatus provides physical separation between VPN and other untrustful network before a message is sent to an IPSec channel. Therefore, the IPSec channel can be securely accessed. The network apparatus is applicable for both household network and VPN.

3 Claims, 5 Drawing Sheets

NETWORK APPARATUS WITH SECURE IPSEC MECHANISM AND METHOD FOR OPERATING THE SAME

BACKGROUND OF THE INVENTION

1. Technical Field

The present invention relates to a network apparatus with secure IPSec mechanism and method for operating the same, and more particularly to a network apparatus providing physical separation between VPN and other networks before a message is sent to an IPSec channel. Therefore, the IPSec channel can be securely accessed, and the network apparatus applicable for both household network and VPN.

2. Description of the Prior Art

The progress of network technology and prevailing of computer develops competitive technology to conventional communication network. For example, VPN (Virtual private network) is a replacement technology for conventional modem and leased line. Via VPN, data, voice and image can be communicated, in point-to-point manner, between two computers through shared and public network.

VPN is commercially interested not only for convenience in data transmission, but also for reduced cost in hardware and communication overhead. The VPN now provides extensive applications including customer-managing VPN for personal user provide by service provider and enterprise VPN for company user.

In other word, VPN provide a convenient communication way between home worker/branch office and head quarter. FIG. 1 shows a prior art VPN topology, wherein three home computers are connected to Internet through a gateway A. The gateway A is connected to a gateway B through an IPSec channel. Therefore, a VPN host in user home can be connected to company intranet through the IPSec channel.

The IPSec channel provides secure data transmission between gateway A and gateway B. However, as shown in FIG. 2, there is no particular mechanism to separate the VPN host from the computers at home. The messages and packets sent by the VPN host have risk of being eavesdropped or captured by other computers at the same home, before them are sent to the gateway A. In other word, the VPN host and the company intranet are open to other computers at the same home.

For example, a user C of high tech company deals with office work at home and the user C uses a notebook computer configured as VPN host for assessing company VPN. In a scenario that another user D also uses a computer at the same home of user C to access network. The data uploaded to or downloaded from company VPN of user C may be easily eavesdropped by user D.

Therefore, a security mechanism for protecting the channel between VPN host and gateway A is of great desire. Moreover, a physical separation between VPN and other network is also demanded for enhanced security.

SUMMARY OF THE INVENTION

The present invention provides a network apparatus with secure IPSec mechanism and method for operating the same, wherein the network apparatus provides physical separation between VPN and other networks before a message is sent to an IPSec channel.

Therefore, the network apparatus according to the present invention includes a VLAN, an MAC filter, an IP restriction unit and a static DHCP. The network apparatus provides physical separation between VPN and other untrustful network before a message is sent to an IPSec channel. Therefore, the IPSec channel can be securely accessed. The network apparatus is applicable for both household network and VPN.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE PREFERRED EMBODIMENTS

Figure 1:
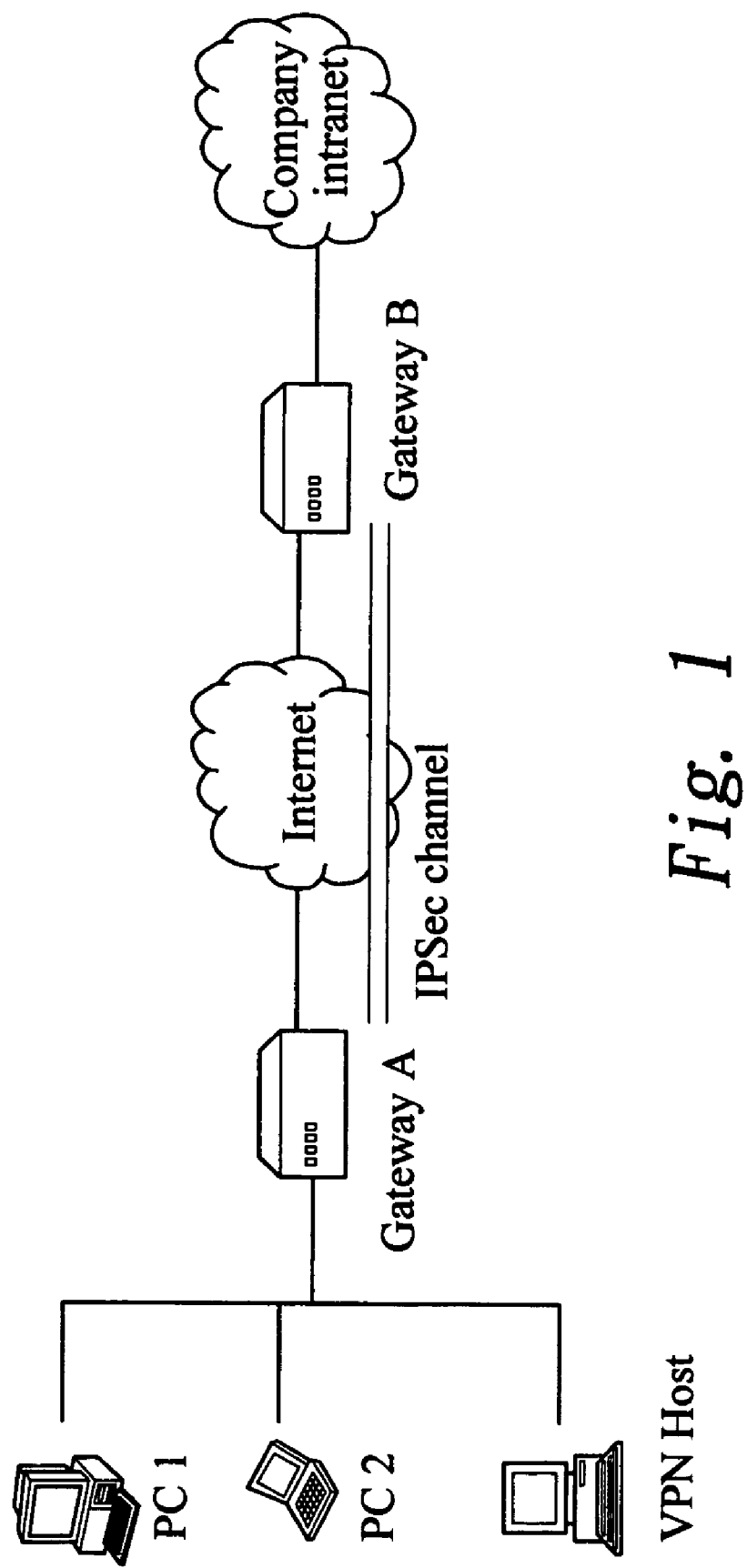
FIG. 1 shows a prior art VPN topology.
Figure 2:
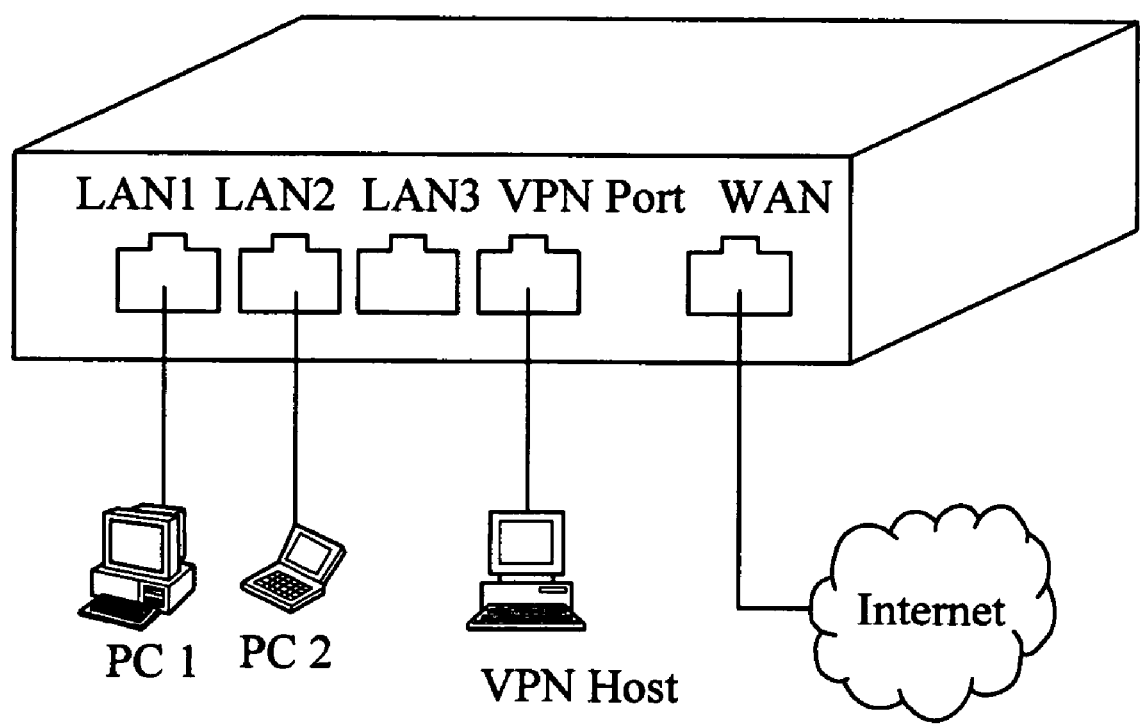
FIG. 2 shows a prior art gateway with VPN port and LAN ports.
Figure 3:
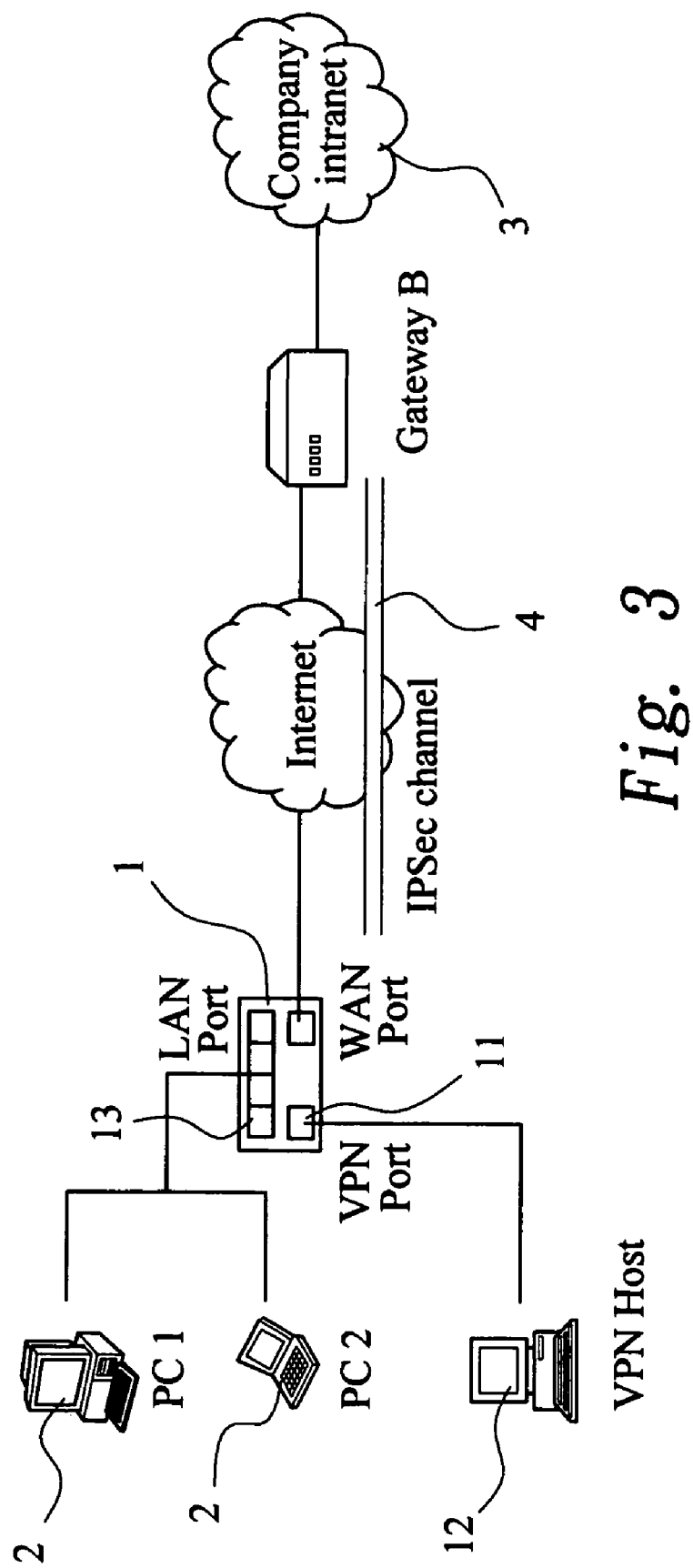
FIG. 3 shows a schematic diagram of a VLAN according to the present invention.

FIG. 3 shows a schematic diagram of a virtual local area network (VLAN) according to the present invention. According to a preferred embodiment, a network apparatus 1 is connected to a plurality of computer devices 2 to group the plurality of computer devices 2 in a LAN. The plurality of computer devices 2 accesses Internet through the network apparatus 1. Moreover, the plurality of computer devices 2 is connected to a remote network 3 through an IPSec channel 4 to form a VLAN.

Figure 4:
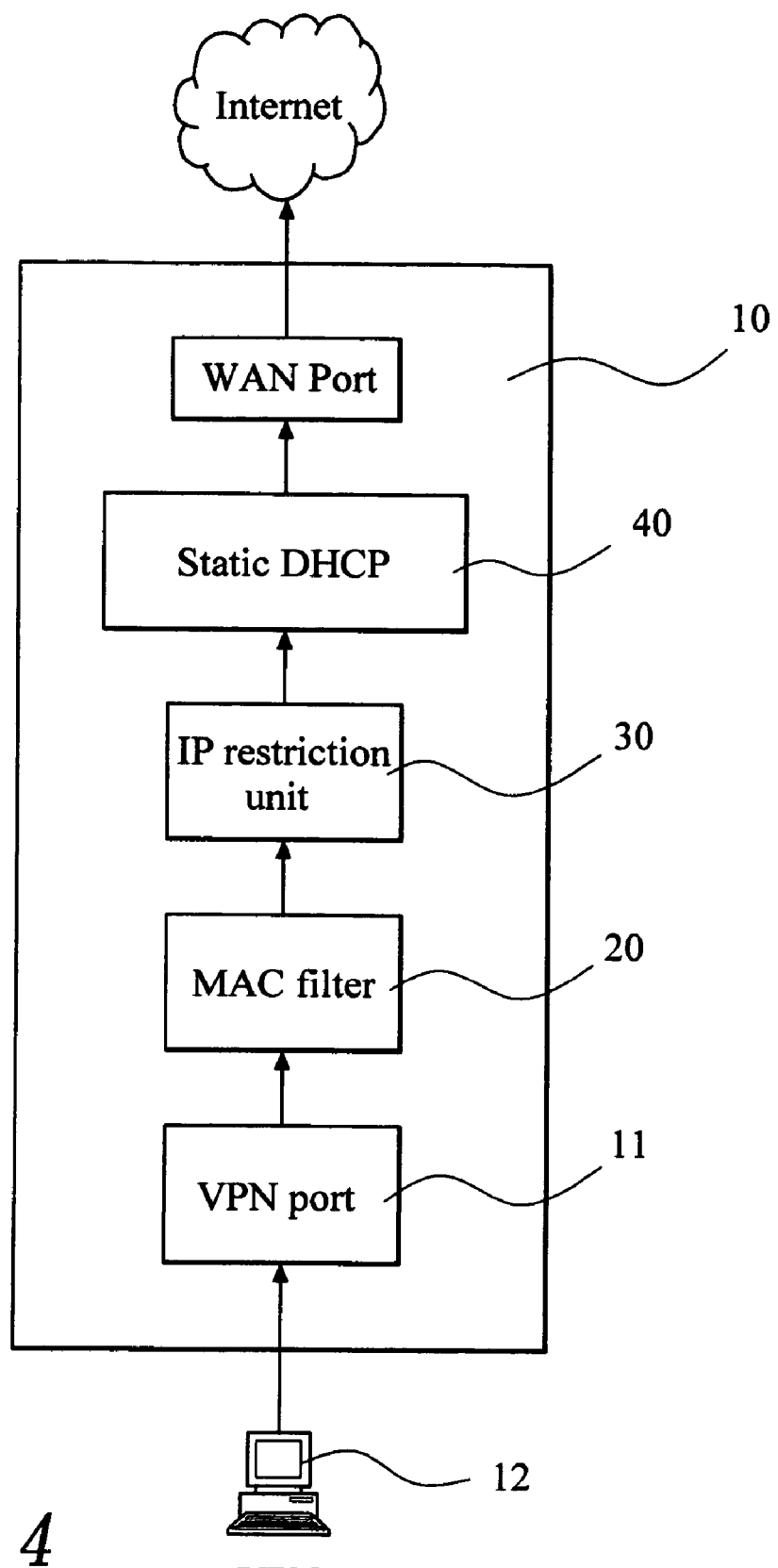
FIG. 4 shows a schematic diagram of the network apparatus according to the present invention.

FIG. 4 shows a schematic diagram of the network apparatus 1 according to the present invention. The network apparatus 1 according to the present invention comprises a VLAN port 10, an MAC filter 20, an IP restriction unit 30 and a static DHCP 40. The VLAN port 10 is divided into a first segment and a second segment, wherein at least one VPN port 11 is allocated to the first segment and a plurality of LAN ports 13 are allocated to the second segment. The VPN port 11 is connected to at least one VPN host 12 and the LAN ports 13 are connected to corresponding computer devices 2.

The MAC filter 20 is connected to the VPN port 11 in the first segment to ensure that only computer with the MAC of the VPN host 12 can access the remote network 3 through the IPSec channel 4.

The IP restriction unit 30 identifies whether a message packet is sent from the VPN host 12 by examining a VLAN tracing tag in the message packet. Moreover, the IP restriction unit 30 determines to send or not to send the message packet to the IPSec channel 4 according to above identification. Therefore, a malicious message packet with fake packet head to mimic the packet of the VPN host 12 can be prevented.

The DHCP (Dynamic host configuration protocol) is generally used to assigns the IP address of a network apparatus when a VPN host is connected to a gateway. After the network apparatus acquires the IP address, the VPN host will always use the IP address when the VPN host is to connect to the gateway.

The network apparatus 1 according to the present invention can also be functioned as VPN gateway by the static DHCP 40, which is derived according to the MAC filter 20 and the IP restriction unit 30. When the network apparatus 1 receives a request message embedded with the IP address of the VPN host 12, the network apparatus 1 will assign an IP address according to the IPSec channel 4. Therefore, the VPN host 12 can be ensured to access the IPSec channel 4 with a specific IP address.

Figure 5:
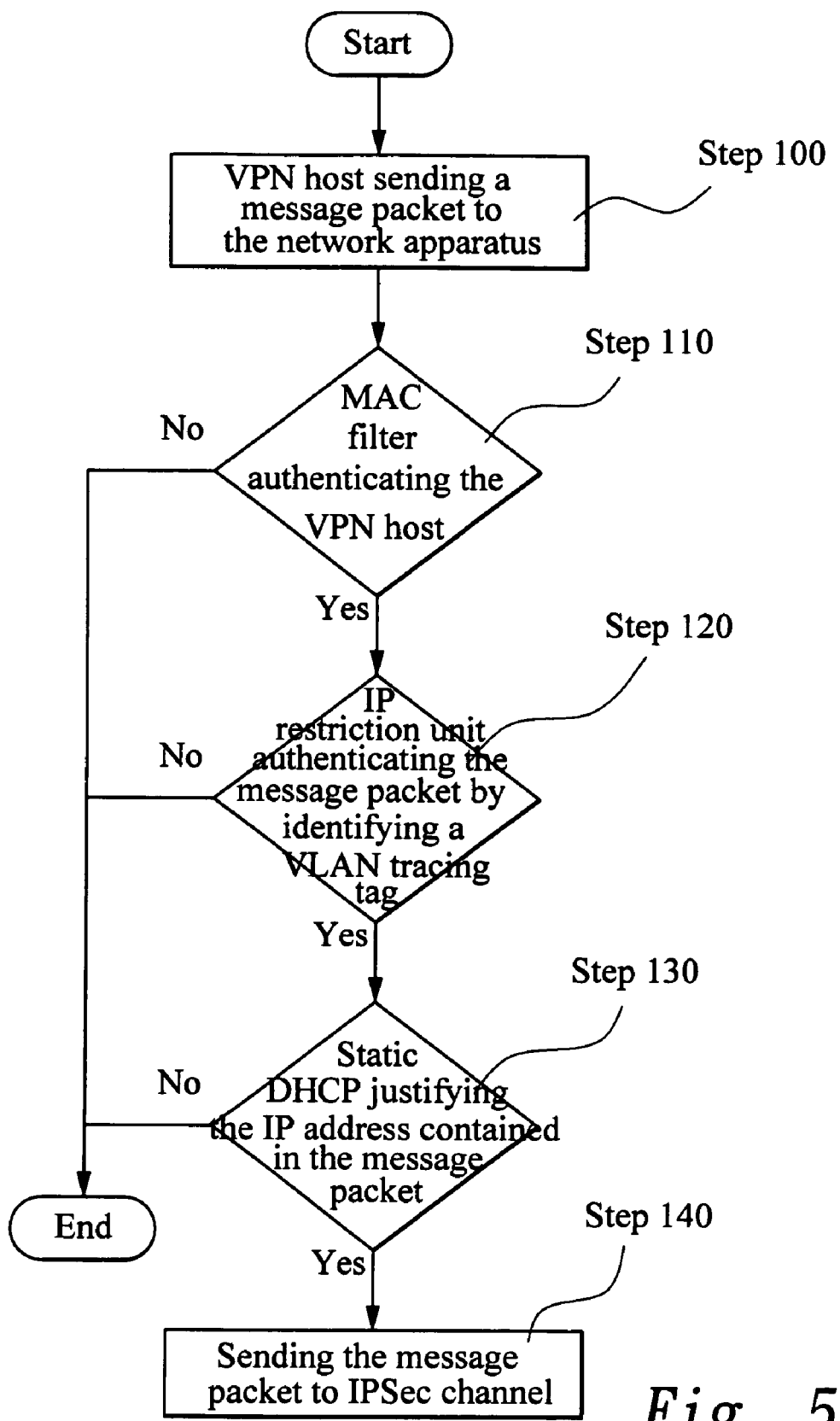
FIG. 5 shows a flowchart for operating the network apparatus with secure IPSec mechanism according to the present invention.

FIG. 5 shows a flowchart for operating the network apparatus with secure IPSec mechanism according to the present invention. At step 100, the VPN host 12 is connected to the VPN port 11 of the network apparatus 1 and the VPN host 12 sends a message packet to the VPN port 11 of the network apparatus 1.

Afterward, the MAC filter 20 resolves the hardware address for the VPN host 12 to authenticate the VPN host 12 and then sends the message packet to the IP restriction unit 30 at step 110.

After the IP restriction unit 30 receives the message packet, the IP restriction unit 30 determines whether the message packet is actually sent by the VPN host 12 and determines to receive the message packet or not at step 120.

When the message packet is authenticated, the message packet is sent to the static DHCP 40 for discrimination. The static DHCP 40 justifies the message packet as being sent from the VPN host 12 by the IP address contained in the message packet at step 130. The message packet sent from the VPN host 12 can be safely sent to the IPSec channel 4 at step 140 for achieving secure transmission before sending to the IPSec channel.

Back to the previous scenario, the user C of high tech company also uses a notebook computer, configured as VPN host 12, for connecting to a company VPN, when he deals with office work at home. In this situation, the VLAN port 10 is divided into a first segment and a second segment. More particularly, the notebook computer, configured as VPN host 12, can access the company VPN through the VPN port 11 in the first segment. Other computer(s) at the home of user C can access to other network such as Internet through the LAN port 13 in the second segment.

When the user C uses the notebook computer to send message packet to the company VPN through the VPN port 11, the MAC filter 20 authenticates the notebook computer and then the message packet is sent to the IP restriction unit 30. The IP restriction unit 30 will accept the message packet after resolving the VLAN tracing tag and identifying the message packet being sent from the notebook computer of the user C.

After the message packet is identified, the static DHCP 40 justifies the message packet as being sent from the notebook computer by the IP address contained in the message packet. Therefore, the message packet sent from the notebook computer can be safely sent to the IPSec channel to achieve secure transmission before sending to the IPSec channel. Moreover, the eavesdropping of data can be prevented.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A network apparatus with secure IPSec mechanism, comprising:
   a virtual local area network (VLAN) port comprising a first segment with at least one VPN port and a second segment with a plurality of LAN ports;
   a MAC filter connected to the VPN port of the first segment and the VPN port being connected to a remote network through an IPSec channel, the MAC filter limiting access to the VPN port to a particular remote computer;
   an IP restriction unit authenticating a message packet sent from the VPN port by resolving a VLAN tracing tag; and
   a static DHCP derived from the MAC filter and the IP restriction unit and ensuring the VPN port connecting to the IPSec channel with a specific IP address
   wherein said network apparatus provides a physical separation between the VPN port and all LAN ports.

2. The network apparatus as in claim 1, wherein the VPN port is connected to at least one VPN host.

3. The network apparatus as in claim 1, wherein the LAN port is connected to at least one computer.

* * * * *